United States Patent [19]
Curtis et al.

[11] Patent Number: 5,280,285
[45] Date of Patent: Jan. 18, 1994

[54] METHOD OF IMPROVED INITIAL TRANSMISSION OF ACQUISITION AND TRACKING INTERROGATIONS IN AN AIRCRAFT TRACKING SYSTEM

[75] Inventors: Michael H. Curtis; Patricia K. Sturm; Kathryn W. Ybarra, all of Phoenix, Ariz.

[73] Assignee: Honeywell, Inc., Minneapolis, Minn.

[21] Appl. No.: 976,150

[22] Filed: Nov. 13, 1992

[51] Int. Cl.$^5$ ............................................. G01S 13/93
[52] U.S. Cl. ..................................................... 342/32
[58] Field of Search .............................. 342/29, 30, 32

[56] References Cited

U.S. PATENT DOCUMENTS

| | | | |
|---|---|---|---|
| 4,107,674 | 8/1978 | Funatsu et al. | 342/32 |
| 5,077,673 | 12/1991 | Brodegard et al. | 342/29 X |
| 5,218,365 | 6/1993 | Woodall | 342/32 X |

Primary Examiner—T. H. Tubbesing
Attorney, Agent, or Firm—A. A. Sapelli; W. Udseth

[57] ABSTRACT

In an aircraft having an aircraft tracking system (ATS), the aircraft being a monitoring aircraft, the monitoring aircraft interrogates target aircraft in the vicinity of the monitoring aircraft in order to determine potentially dangerous situations. The target aircraft responds to the interrogations with parameter information which includes identification (ID). A method of interrogating the target aircraft comprises the steps of receiving unsolicited signals from the target aircraft in the vicinity of the monitoring aircraft. The received unsolicited signals are received by the monitoring aircraft at a first power level. Based on the first power level of the received unsolicited signals, the monitoring aircraft interrogates the target aircraft with a first interrogation signal. The first interrogation signal is transmitted at a second power level, the second power level being based on the first power level of the received unsolicited signal, thereby minimizing interference in the environment and optimizing receipt of the first interrogation signal by the target aircraft.

12 Claims, 5 Drawing Sheets

METHOD OF IMPROVED INITIAL TRANSMISSION OF ACQUISITION AND TRACKING INTERROGATIONS IN AN AIRCRAFT TRACKING SYSTEM

RELATED PATENT APPLICATION

The present application is related to U.S. patent application, Ser. No. 07/767,007, now U.S. Pat. No. 5,235,336, entitled "Method of Bearing Determination Utilizing a Bottom Antenna in an Aircraft Tracking System", by P. Sturm et al, filed on Sep. 27, 1991, and to U.S. patent application, Ser. No. 07/687,965, now U.S. Pat. No. 5,208,591, entitled "Improved Track Extension for Use with ATCRBS Surveillance Procedures", by K. Ybarra et al, filed on Apr. 19, 1991, both of the related applications being assigned to Honeywell Inc., the assignee of the present application.

BACKGROUND OF THE INVENTION

The present invention relates to a method of aircraft traffic indication, and more particularly, to a method of aircraft traffic acquisition and surveillance utilizing minimum interrogation power thereby reducing RF interference and increasing the surveillance coverage.

The increased demands placed on the aircraft flight deck as a result of more complex technology, ever increasing aircraft traffic, and increased demands for safety has brought about a requirement for monitoring of aircraft traffic in a vicinity of an aircraft (intruder aircraft) that includes automatic identification of potential threats to the monitoring aircraft. As a result, aircraft can have transponders associated therewith that, in response to appropriate electromagnetic interrogation signals induce responding electromagnetic signals that provide information with respect to the range, altitude, and bearing of the interrogated aircraft. Certain traffic control system transponders, e.g., the Mode S system, include target identification as part of the information imposed on the responding electromagnetic signals. For these Mode S systems, the identification of the path or track of the responding aircraft is relatively simple, involving time dependent positions and altitudes of an identified aircraft. Similarly, extrapolations or extensions of aircraft tracks can be relatively simple. The operation of aircraft collision avoidance apparatus is governed by the Radio Technical Commission for Aeronautics (RTCA) Minimum Operational Performance Standards (MOPS) for Traffic Alert and Collision Avoidance System (TCAS) Airborne Equipment manual document number RTCA/DO185.

When TCAS equipped aircraft operate in high density traffic areas, the rf environment can become crowded in the frequency band in which the TCAS and air traffic control (ATC) interrogators and transponders operate. Presently, most acquisition and tracking interrogations are transmitted at power levels that are much higher than necessary. These unnecessarily high power levels contribute to the crowded airwave condition and interference levels in the atmosphere.

Thus there is a need to provide a method which provides for reliable acquisition and tracking of these intruder aircraft without substantially contributing to the rf interference of the environment. The present invention provides a method which uses the received power level and angle of arrival of squitters (periodic unsolicited identity transmissions), altitude fruit (responses to interrogations from interrogators other than own aircraft), or tracking replies to measure the reply path loss, estimate the transmission path loss, and determine the antenna direction, and power level at which the subsequent interrogation should be transmitted. Because this interrogation technique significantly reduces the average TCAS transmitted power, it reduces the need for use of interference limiting procedures. This concept is also very useful in maintaining a larger TCAS surveillance volume relative to using the current algorithms in high traffic density areas. This interrogation technique further increases the safety of the TCAS system. If the low power interrogations are not successful, the intruder is re-interrogated with a power level that is equal to or greater than that used in previous methods. Thus, TCAS may track threatening intruders using this method that it may have missed using the previous methods but it will not miss any intruders it would have tracked using previous methods.

SUMMARY OF THE INVENTION

Therefore, there is provided by the present invention, a method of air traffic acquisition and surveillance utilizing minimum interrogation power thereby reducing interference within the environment. In an aircraft having an aircraft tracking system (ATS), the aircraft being a monitoring aircraft, the monitoring aircraft interrogates target aircraft in the vicinity of the monitoring aircraft in order to determine potentially dangerous situations. The target aircraft responds to the interrogations with parameter information which includes identification (ID). A method of interrogating the target aircraft comprises the steps of receiving unsolicited signals from the target aircraft in the vicinity of the monitoring aircraft. The unsolicited signals are received by the monitoring aircraft at a first power level. Based on the first power level (which may be based on one of several possible power measurements) of the received unsolicited signals, the monitoring aircraft interrogates the target aircraft with a first interrogation signal. The first interrogation signal is transmitted at a second power level, the second power level being based on the first power level of the received unsolicited signal, thereby minimizing interference in the environment and optimizing receipt of the first interrogation signal by the target aircraft.

Accordingly, it is an object of the present invention to provide a method for interrogating aircraft.

It is another object of the present invention to provide a method for the reliable acquisition and surveillance of aircraft with minimum interrogation power levels.

These and other objects of the present invention will become more apparent when taken in conjunction with the following description and attached drawings, wherein like characters indicate like parts, and which drawings form a part of the present application.

DETAILED DESCRIPTION

Figure 1:
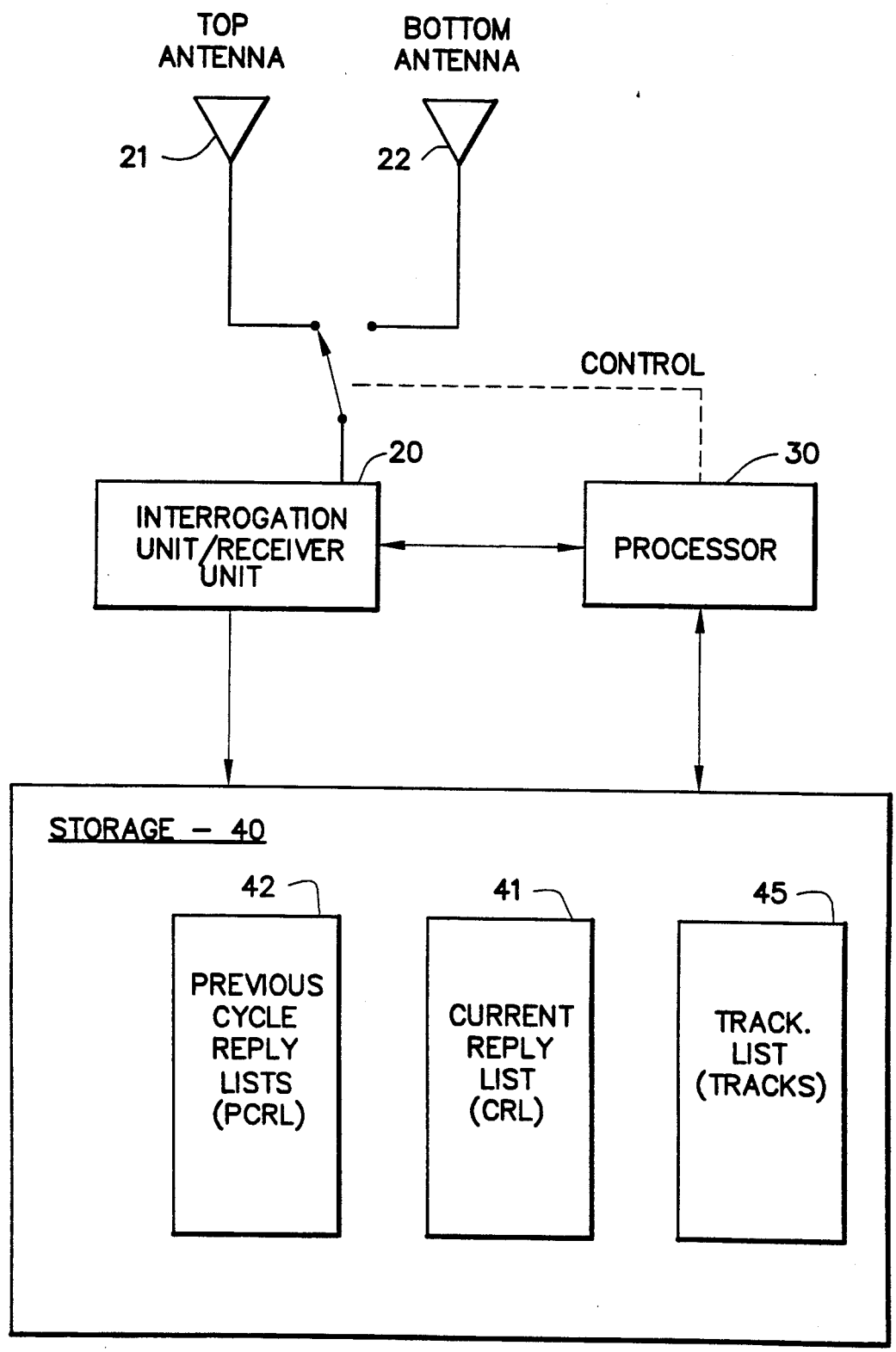
FIG. 1 shows a partial block diagram of a representative system in which the method of the present invention can be utilized.

Referring to FIG. 1, there is shown a block diagram of a representative system in which the method of the present invention can be utilized. An interrogation unit 20 performs a predetermined interrogation sequence to Mode S each intruder (which will be terminated upon receipt of a valid reply) transmitting a predetermined pulse sequence to a predetermined one of a plurality of antennas, in this example, a top antenna 21 or a bottom antenna 22 as controlled by a processor 30. Replies to the interrogations from a target aircraft, sometimes referred to as an intruder, are received by the respective antenna and processed by the processor 30. The results are coupled to and saved in a storage unit 40, in particular, the current reply, list (CRL) 41. The CRL 41 includes processed data for each reply, which includes range, altitude, bearing, . . . The storage unit 40 is partitioned to include previous cycle reply lists (PCRL) 42. These lists can be maintained by any standard technique well known in the art. A list of tracks is maintained in a separate track list, TRACKS 45, the tracks being updated by any one of a variety of known techniques, or updated by the technique disclosed in the related applications referred to above, and as described in U.S. Pat. No. 5,107,268.

Figure 2:
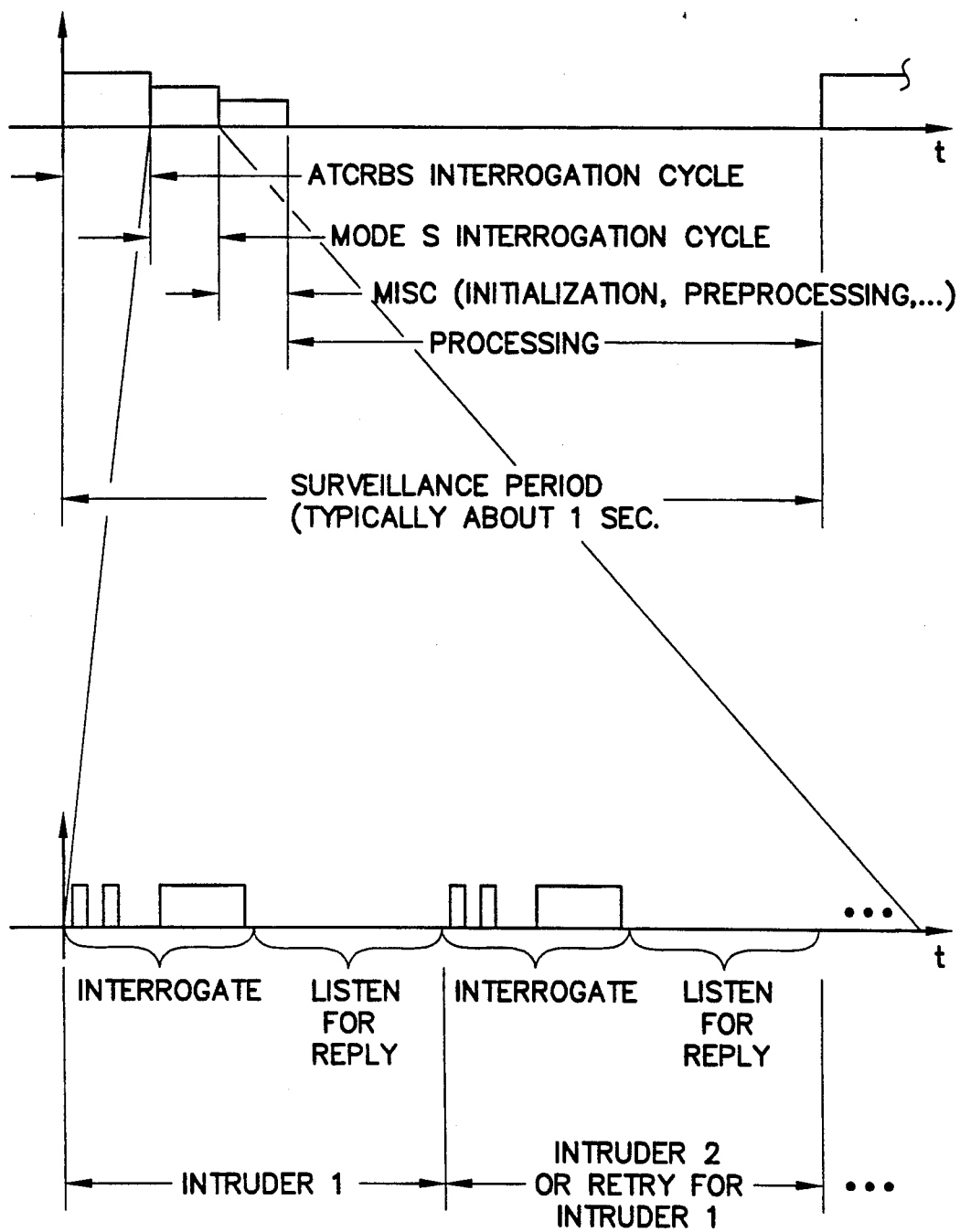
FIG. 2 shows a time line of a surveillance period.

Referring to FIG. 2, there is shown a time line of a typical surveillance period (or cycle), which is also utilized in the TCAS system the aircraft tracking system) of the preferred embodiment. The surveillance period of the preferred embodiment of the system is approximately 1 sec during which time an interrogation sequence is performed for Air Traffic Control Radar Beacon System (ATCRBS) systems, Mode S type interrogations take place, and finally the processing of the replies and tracks is performed. After the interrogation sequences of a surveillance period are completed and the reply data is stored in the current reply list 41 (CRL), the updating process of targets begins. The next track in the track list is selected to be updated, the first time through the update processing, the next track is the first track. It will be understood by those skilled in the art that initially pointers, indexes, . . . are initialized the first time the processing starts in a surveillance period, the method utilized for maintaining and processing these lists can be any method well known to those skilled in the art and is not critical to an understanding of the method of the present invention.

Figure 3:
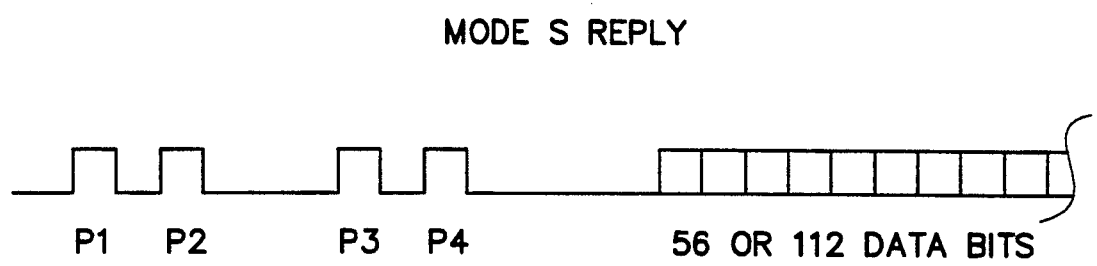
FIG. 3 shows a pulse pattern of a Mode S response.

Referring to FIG. 3, there is shown a bit pattern of a Mode S reply. The P1 through P4 preamble pulses of the Mode S response are always present. The data bits include intruder aircraft data such as altitude, and a predetermined identification number (ID).

The method of the present invention will now be described. The present invention is directed to a method of intruder acquisition and surveillance utilizing minimum interrogation power. The method of the present invention includes varying the interrogation power to a minimum value which still results in reliable intruder acquisition and surveillance. The method of the present invention is applicable to Mode S transponders since the ATCRBS interrogation sequence includes transmitting pulses at different power levels as part of the normal interrogation sequence.

An acquisition interrogation is a transmission sent by TCAS to Mode S equipped intruders for the purpose of acquiring specific information about the intruder. The need for an acquisition interrogation is indicated by reception of unsolicited replies. This information includes intruder altitude and separation range. When this information indicates that an intruder should be tracked, tracking interrogations are issued. Tracking interrogations solicit information from Mode S equipped intruders which provide TCAS with a continuous estimate of their range, bearing, and altitude. In present systems an interrogation is defined as: 1) four transmissions, one in each beam direction, when a directional antenna is being used -OR- 2) a single transmission when an omnidirectional antenna is used. In these present systems, acquisition interrogations are transmitted at maximum power unless they are restricted by interference limiting requirements, and tracking interrogations are transmitted at power levels defined by the formula:

$$P_i = P_{imax} + 20 \log(R/10) \text{ for } R < 10 \text{ nmi}, P_i = P_{imax} \text{ for } R \geq 10 \text{ nmi}.$$

where $P_i$ is the transmitted interrogation power, $P_{imax}$ is the maximum transmitted interrogation power, and R is the intruder separation range.

The method of the present invention adds one transmission to each type of interrogation. This transmission is the first sent in the initial interrogation to an intruder in question in each surveillance scan. It is sent in the direction, from the antenna, and at the power level defined below. If this first (new) interrogation attempt were unsuccessful, the remaining transmissions would be made at a higher power level (if possible) to ensure maximum reply probability and system safety, and is described in detail hereinunder.

The method for performing the initial acquisition transmission according to the method of the present invention assumes that all squitter and fruit replies are transmitted at the maximum power allowed in RTCA/-DO181A, the Mode S MOPS, 57 dBm (500 watts, W) regardless of aircraft operational capabilities. From the last two squitter/fruit replies received (from the intruder in question), a check is made to determine the higher of the two power levels received. Using the higher power level a path loss between the aircraft and the intruder is determined by subtracting the measured reply power from the maximum specified transmit power level of the transponder. Assuming that the reply was transmitted at the maximum specified power level results in a path loss measurement that is equal to or greater than the actual loss. This leads to a higher interrogation power and increases the probability of acquiring the intruder on the first attempt. (A detailed description of the power calculations is shown in Appendix A.)

The acquisition interrogation power is calculated by subtracting total path losses from the maximum specified Mode S MTL (minimum trigger level) plus a 4 dB margin for error as shown in equations (4) through (8) in Appendix A. If interference limiting is active and the computed power level is greater than that allowed, the power specified by interference limiting requirements is used. If the computed power is greater than the maximum TCAS transmitter output, the interrogation is transmitted at full power. If the computed power is less than the minimum transmitter output, minimum transmitter power is used.

A determination is made as to which antenna the reply selected above was received. The interrogation is transmitted via this antenna. If the antenna is directional, the angle of arrival (AoA) of the reply is determined via techniques well known in the art. The initial acquisition attempt is made in the direction of the AoA.

If the initial acquisition attempt described above is unsuccessful, any remaining attempts to acquire the intruder in question are made at the highest power allowed until the beginning of the next surveillance scan.

The method of performing the initial tracking transmission according to the method of the present invention assumes that all acquisition and tracking replies are transmitted at 57 dBm (500 W) regardless of aircraft operational capabilities. Using the power level of the last received tracking reply (or acquisition reply if this is the first tracking interrogation), the path loss is determined between the aircraft TCAS and intruder transponder by subtracting the measured reply power from the maximum specified transmit power level of the transponder. The interrogation power is computed according to equations (4) through (8) of Appendix A.

The initial tracking interrogation attempt is transmitted at the power level calculated above. This interrogation is transmitted from the same antenna that the intruder's last reply was received. If this antenna is directional, the transmission is made in the direction from which the last reply was received.

If the computed power is greater than the maximum TCAS transmitter output, the interrogation is transmitted at full power. If the computed power is less than the minimum output level for the TCAS transmitter, the interrogation is transmitted at minimum power. It is possible that the interrogation power calculated above could be higher than it would have been using previous power programming methods. This only happens if path losses are unusually high and provides the method of the present invention with a significant safety advantage over the previous methods.

If the initial attempt does not elicit a reply, any transmissions remaining in the interrogation are made at the greater of the power levels calculated above and the formula:

$$P_i = P_{imax} + 20 \log(R/10) \text{ for } R < 10 \text{ nmi. } P_i = P_{imax} \text{ for } R \geq 10 \text{ nmi.}$$

If these attempts are unsuccessful, the 2nd through nth interrogations of the scan are then made using maximum transmitter power. This is another way in which system safety is enhanced. Table 1 summarizes the interrogation power output by the present invention in comparison to present day systems.

Figure 4A:
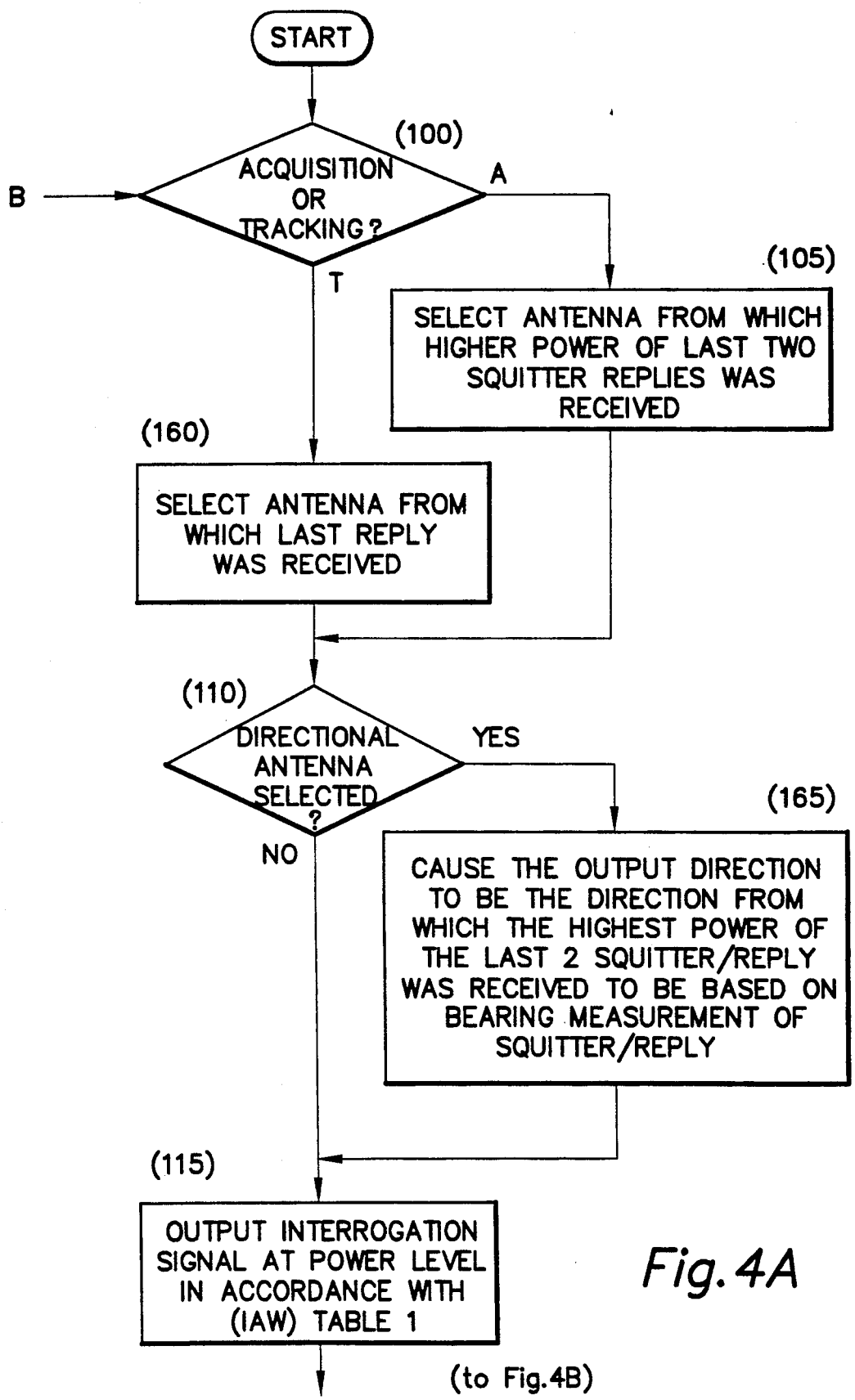
FIG. 4A and 4B show a flow diagram of a Mode S interrogation cycle during a surveillance period.
Figure 4B:
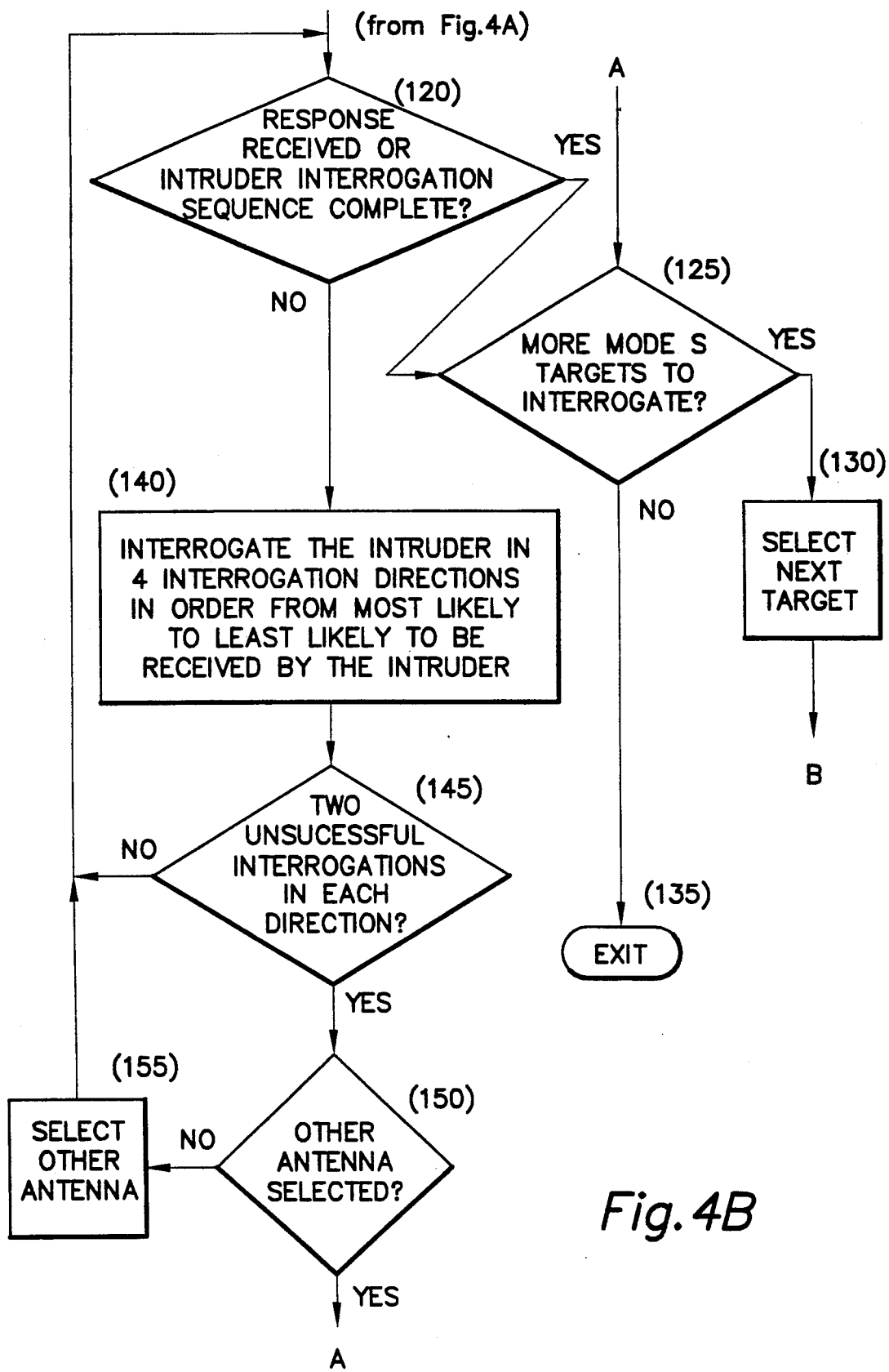

Referring to FIGS. 4A and 4B, there is shown a flow diagram of a Mode S interrogation cycle during a surveillance period, consistent with the time line of FIG. 2. During Mode S interrogation of targets (i.e., intruders) being tracked, it is desired to attempt to acquire aircraft as targets from squitters received, which provide ID, received power, . . . When the Mode S interrogation cycle starts, the requisite initialization and housekeeping procedures are performed (implied via the dotted line).

The target to be interrogated is determined to be an acquisition or a tracking interrogation (block 100). If the interrogation is to be an acquisition interrogation from previously received squitters, the antenna from which the highest power of the last two squitter replies was received is selected (block 105). If the antenna selected was not a directional antenna (block 110), the interrogation signal is output from the selected antenna at a power level in accordance with (IAW) Table 1 (block 115). If a valid response is received in response to the interrogation (block 120), no more outputs or interrogations to that intruder are made during this surveillance period. If there are more Mode S targets to interrogate (block 125), the next target is selected (block 130), and the interrogation cycle continues at block 100. If there are no more Mode S targets to interrogate (block 125), the Mode S interrogation cycle for this surveillance period is completed and the Mode S interrogations are exited (block 135).

If as a result of the output interrogation (block 115), no valid response was received (block 120), the intruder is interrogated with the higher power level in four interrogation directions in order from most likely to least likely to be received by the intruder (block 140). If a response was received from any of these interrogations or the intruder interrogation sequence has been completed, (block 120), then the processing continues at block 125. If no response was received from these interrogations (block 140), and two unsuccessful interrogations in each direction have not been performed (block 145), then the interrogation loop is repeated starting at block 120. If two unsuccessful interrogations in each direction have completed (block 145), then if only one antenna has been selected (block 150), then the other antenna is selected (block 155), and the interrogation loop is repeated starting at block 120. If both antennas have been utilized for the interrogation loop (block 150), then the processing continues at block 125 and the next Mode S target is interrogated at block 125. The processing is essentially the same for both an acquisition or a tracking mode intruder. For a tracking mode intruder (block 100), the antenna selected is the antenna from which the last reply was received (block 160). In the interrogation cycle if a directional antenna was selected (block 110), the initial interrogation is output in a direction from which the higher power of the last two squitters (or reply if in a tracking mode) was received and is based on the bearing measurement of the squitter (or reply if in a tracking mode) (block 165). In either case, acquisition or tracking, the power level of the interrogation signal output is in accordance with the power indicated in Table 1, generally based on the received power. In this manner, the RF power transmitted into the atmosphere is minimized thereby reducing interference into the atmosphere.

As an example of the interrogation power calculation, assume a squitter/reply in question was received at a power level of $-60$ dBm. Using equation (3) from Appendix A with antenna gains of 3 dBi yields a path loss of $G_p = -60 \text{ dBm} - 57 \text{ dBm} - 3 \text{ dBi} - 3 \text{ dBi} = -123$ dBm. With this path loss and equation (7) the interrogation power can be computed as $P_i = -G_p - G_m - G_i - 67 \text{ dBm} = 123 \text{ dBm} - 3 \text{ dBi} - 3 \text{ dBi} - 67 \text{ dBm} = 50 \text{ dBm}$. Combining equations (3) and (7) gives the equivalent result of equation (8) $P_i = -10 \text{ dBm} - P_r = -10 \text{ dBm} + 60 \text{ dBm} = 50 \text{ dBm}$.

Although not discussed, it will be understood by those skilled in the art that the power level of the Mode S interrogation sequence output to the antenna is via an attenuator controllable by the processor of the aircraft tracking system.

TABLE 1

| | Present Day System | Present Invention |
|---|---|---|
| Acquisition | Full power ($P_{imax}$) (or max allowed | Based on received power. If no reply received, full power |

TABLE 1-continued

| | Present Day System | Present Invention |
|---|---|---|
| Tracking | by interference limiting) | or max allowed by interference limiting. |
| Range < 10 nmi | $P = P_{imax} + 20 \log \frac{R}{10}$ | Based on received power. If no reply, then the higher of the power level derived from the received power or $P_{imax} + 20 \log \frac{R}{10}$. If still no reply, then transmit at max power ($P_{imax}$). |
| Range ≥ 10 nmi | Full power ($P_{imax}$) | | maximum ATS interrogation power = 57 dbm in the preferred embodiment of the present invention It will also be understood by those skilled in the art that many alternatives and variations can exist in calculating the transmit power of the interrogation signal, including allowing wider tolerances and safety factors, attempting to allow for differences in antenna gains between the tracking and the monitoring aircraft, . . . Further it will be understood by those skilled in the art that alternatives and variations can exist in the interrogation sequence, direction of interrogation, number of attempts, choice of antennas, . . . without departing from the spirit and scope of the present invention.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

APPENDIX A

Technique for Initial Transmission of
Acquisition and Tracking Interrogations $G_m$ = Mode S antenna gain  $G_p$ = Path Gain
$G_t$ = TCAS antenna gain  $P_t$ = Mode S transmit power
$P_r$ = Power of received reply  $P_i$ = TCAS interrogation power
$P_c$ = Power cushion to account for anomalies
$P_m$ = Mode S receiver maximum specified MTL = −71 dBm Assumptions:
$G_p$ is the same for transmit and receive frequencies
$G_t$ is equal for directional and omnidirectional antennas and at transmit and receive frequencies
$P_t$ = 57 dBm
$P_i$(maximum) = 56 dBm
$P_c$ = 4 dB Mode S Reply Path Loss

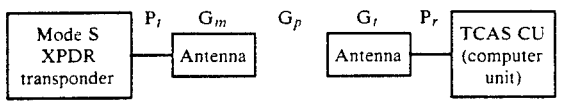

(1) $P_r = G_m + G_p + G_t + P_t \rightarrow$
(2) $G_p = P_r - P_t - G_m - G_t$
(3) $G_p = P_r - 57 \text{ dBm} - G_m - G_t$ Interrogation Power Determination

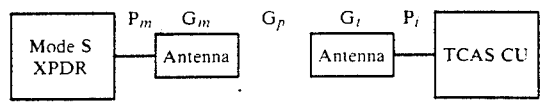

APPENDIX A-continued

Technique for Initial Transmission of
Acquisition and Tracking Interrogations (4) $P_m = G_m + G_p + G_t + P_i$
Adding $P_c$ to the receiver MTL to account for anomalies gives:
(5) $P_m + P_c = G_m + G_p + G_t + P_i \rightarrow$
(6) $-67 \text{ dBm} = G_p + P_i + G_m + G_t$
(7) $P_i = -G_p - G_m - G_t - 67 \text{ dBm}$
Substituting $G_p$ from equation (3) above gives:
(8) $P_i = -10 \text{ dBm} - P_r$

We claim:

1. In an aircraft having an aircraft tracking system, said aircraft being a monitoring aircraft, and wherein said monitoring aircraft interrogates target aircraft in the vicinity of said monitoring aircraft in order to determine potentially dangerous situations, said target aircraft responding to said interrogations with parameter information which includes identification (ID), a method of interrogating said target aircraft comprising the steps of:
 a) receiving unsolicited signals from the target aircraft in the vicinity of the monitoring aircraft, the received unsolicited signals being received by the monitoring aircraft at a first power level; and
 b) based on the first power level of the received unsolicited signals, interrogating the target aircraft with a first interrogation signal, the first interrogation signal being transmitted at a second power level, the second power level being based on the first power level of the received unsolicited signals, thereby minimizing interference in the environment and optimizing receipt of the first interrogation signal by the target aircraft.

2. In an aircraft having an aircraft tracking system, a method of interrogating target aircraft according to claim 1 further comprising the steps of:
 a) receiving a response signal from the target aircraft in response to the first interrogation signal; and
 b) if a response signal is not received from the target aircraft, transmitting subsequent interrogation signals in a predetermined pattern and at the second power level until the predetermined pattern is completed or a response signal is received.

3. In an aircraft having an aircraft tracking system, a method of interrogating the target aircraft according to claim 2, wherein the step of transmitting subsequent interrogation signals in the predetermined pattern comprises the steps of:
 a) transmitting the interrogation signal in a predetermined plurality of directions when the transmissions are to be from a directional antenna; otherwise
 b) transmitting the interrogation signal from an omnidirectional antenna, the transmission of the interrogation signal from either antenna of steps (a) or (b) to be at the second power level, the second power level being the power calculated based o the first power level; and
 c) if still no reply is received, transmitting the interrogation signals from an alternate antenna when available.

4. In an aircraft having an aircraft tracking system, a method of interrogating the target aircraft according to claim 3, further comprising the steps of:

a) after the target aircraft has been acquired, interrogating the target aircraft with the first tracking interrogation signal at the second power level; and
b) receiving the response signal from the aircraft in response to the first tracking interrogation signal.

5. In an aircraft having an aircraft tracking system, a method of interrogating target aircraft according to claim 4 further comprising the steps of:
a) selecting the antenna to be used, the antenna being the antenna from which the last response signal was received;
b) if a response signal is not received from the target aircraft in response to the first tracking interrogation signal, transmitting subsequent tracking interrogation signals in a plurality of directions if the transmissions are to be from the selected directional antenna; otherwise
c) transmitting the subsequent tracking interrogation signals from the selected omni-directional antenna, the transmission of the subsequent tracking interrogation signals from either antenna of steps (b) or (c) being at a third power level, the third power level being the higher of the second power level or a power specified by a predetermined equation, the equation being a function of range.

6. In an aircraft having an aircraft tracking system, a method of interrogating target aircraft according to claim 5, further comprising the steps of:
if still no reply is received after transmitting the subsequent tracking interrogation signals, retransmitting further subsequent tracking interrogation signals at a sixth power level.

7. In an aircraft having an aircraft tracking system, a method of interrogating target aircraft according to claim 4 further comprising the steps of:
a) selecting the antenna to be used, the antenna being the antenna from which the last response signal was received;
b) if a response signal is not received from the target aircraft in response to the first tracking interrogation signal, transmitting subsequent tracking interrogation signals in a plurality of directions if the transmissions are to be from the selected directional antenna; otherwise
c) transmitting the subsequent tracking interrogation signals from the selected omni-directional antenna, the transmission of the subsequent tracking interrogation signals from either antenna of steps (b) or (c) being at a third power level, the third power level being the higher of the second power level or a power specified by a predetermined equation, the equation being a function of range, wherein the first, second, and third power level is less than or equal to a fourth power level, the fourth power level being a level of power specified by interference limiting requirements to minimizing interference in the environment.

8. In an aircraft having an aircraft tracking system, a method of interrogating target aircraft according to claim 4 further comprising the steps of:
a) selecting the antenna to be used, the antenna being the antenna from which the last response signal was received;
b) if a response signal is not received from the target aircraft in response to the first tracking interrogation signal, transmitting subsequent tracking interrogation signals in a plurality of directions if the transmissions are to be from the selected directional antenna; otherwise
c) transmitting the subsequent tracking interrogation signals from the selected omni-directional antenna, the transmission of the subsequent tracking interrogation signals from either antenna of steps (b) or (c) being at a third power level, the third power level being the higher of the second power level or a power specified by a predetermined equation, the predetermined equation being:

$$\text{power} = P_{imax} + 20 \log \frac{R}{r}, \text{ for } R < r \text{ nmi, and}$$
$$= P_{imax}, \text{ for } R \geq r \text{ nmi},$$

where
R = range of the target aircraft, and
r = a predetermined range, the predetermined equation being a function of range, and wherein the first, second, and third power level is less than or equal to a fourth power level, the fourth power level being a level of power specified by interference limiting requirements to minimizing interference in the environment.

9. In an aircraft having an aircraft tracking system, a method of interrogating target aircraft according to claim 4 further comprising the steps of:
a) selecting the antenna to be used, the antenna being the antenna from which the last response signal was received;
b) if a response signal is not received from the target aircraft in response to the first tracking interrogation signal, transmitting subsequent tracking interrogation signals in a plurality of directions if the transmissions are to be from the selected directional antenna; otherwise
c) transmitting the subsequent tracking interrogation signals from the selected omni-directional antenna, the transmission of the subsequent tracking interrogation signals from either antenna of steps (b) or (c) being at a third power level, the third power level being the higher of the second power level or a power specified by a predetermined equation, the equation being a function of range; and
d) if still no reply is received after transmitting the subsequent tracking interrogation signals, retransmitting further subsequent tracking interrogation signals at a sixth power level, wherein the sixth power level of said further subsequent tracking interrogation signals is maximum power allowed.

10. In an aircraft having an aircraft tracking system, a method of interrogating target aircraft according to claim 4 further comprising the steps of:
a) selecting the antenna to be used, the antenna being the antenna from which the last response signal was received;
b) if a response signal is not received from the target aircraft in response to the first tracking interrogation signal, transmitting subsequent tracking interrogation signals in a plurality of directions if the transmissions are to be from the selected directional antenna; otherwise
c) transmitting the subsequent tracking interrogation signals from the selected omni-directional antenna, the transmission of the subsequent tracking interrogation signals from either antenna of steps (b) or (c) being at a third power level, the third power level being the higher of the second power level or a power specified by a predetermined equation, the predetermined equation being:

$$\text{power} = P_{imax} + 20 \log \frac{R}{r}, \text{ for } R < r \text{ nmi. and}$$
$$= P_{imax}, \text{ for } R \geq r \text{ nmi,}$$

where
R = range of the target aircraft, and
r = a predetermined range;
wherein the predetermined range, r, is 10 nmi (nautical miles), the predetermined equation being a function of range, and wherein the first, second, and third power level is less than or equal to a fourth power level, the fourth power level being a level of power specified by interference limiting requirements to minimizing interference in the environment.

11. In an aircraft having an aircraft tracking system, a method of interrogating the target aircraft according to claim 3, wherein the step of transmitting the interrogation signals from an alternate antenna comprises the steps of:
   a) if still no reply is received, retransmitting the interrogation signal of steps (a) or (b) of claim 3 at a fifth power level; and
   b) if there still is no reply, transmitting the interrogation signals from an alternate antenna when available.

12. In an aircraft having an aircraft tracking system, a method of interrogating the target aircraft according to claim 3, wherein the step of transmitting the interrogation signals from an alternate antenna comprises the steps of:
   a) if still no reply is received, retransmitting the interrogation signal of steps (a) or (b) of claim 3 at a fifth power level, wherein the fifth power level is maximum power allowed; and
   b) if there still is no reply, transmitting the interrogation signals from an alternate antenna when available.

* * * * *